Nov. 25, 1958
J. E. COLLINS
2,861,592
PLUNGER VALVE WITH SOLENOID PILOT AND MANUAL
OVERRIDE VALVE MECHANISM
Filed March 11, 1954
2 Sheets-Sheet 1
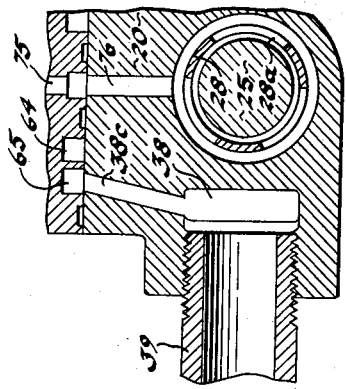
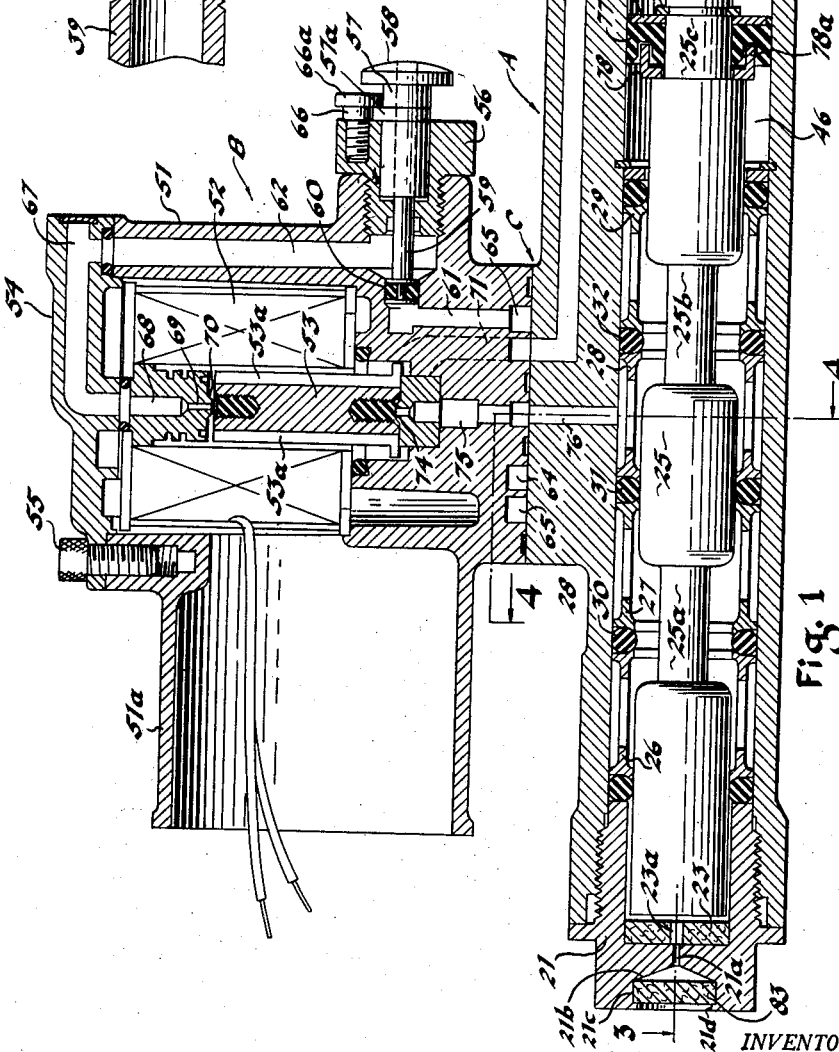
INVENTOR.
John E. Collins
BY
Hyde, Meyer, Baldwin & Doran
ATTORNEYS Nov. 25, 1958

J. E. COLLINS 2,861,592

PLUNGER VALVE WITH SOLENOID PILOT AND MANUAL
OVERRIDE VALVE MECHANISM

Filed March 11, 1954

INVENTOR.
John E. Collins
BY
Hyde, Meyer, Baldwin & Doran
ATTORNEYS

United States Patent Office 2,861,592
Patented Nov. 25, 1958

2,861,592

PLUNGER VALVE WITH SOLENOID PILOT AND MANUAL OVERRIDE VALVE MECHANISM

John E. Collins, Akron, Ohio

Application March 11, 1954, Serial No. 415,640

8 Claims. (Cl. 137—623)

The invention relates to control valves of the plunger type. It particularly relates to valves of this character which are solenoid operated, that is to say, wherein the motive force is triggered by reciprocation of a solenoid plunger in a manner to be hereinafter described.

An object of the invention is to provide a valve of the type above indicated which is more efficient and durable than heretofore produced.

Another object is to provide a valve as characterized above which can undergo millions of cycles of hard service without maintenance troubles.

Another object is to provide a valve as defined in the preceding paragraphs, and provided with manual override means for operation when the current is turned off.

Another object of the invention is to provide a valve as above defined which is adapted to rapid reciprocation, for example, 300 to 600 or more cycles per minute, at low current consumption, not in excess of ten watts.

Another object of the invention is to provide a valve in which return springs are obviated by admission of air alternately at both ends for plunger reversal.

Another object of the invention is to provide a valve of the character described in which the plunger can be removed and repacked without disturbing the piping connections.

Other objects and advantages will be apparent from a study of the following description of one embodiment of the invention, in conjunction with the accompanying drawings, in which:

Fig. 1 is a vertical sectional view through my plunger valve and solenoid pilot valve control.

Fig. 4 is a fragmentary sectional view taken on the line 4—4 of Fig. 1.

Figure 2:
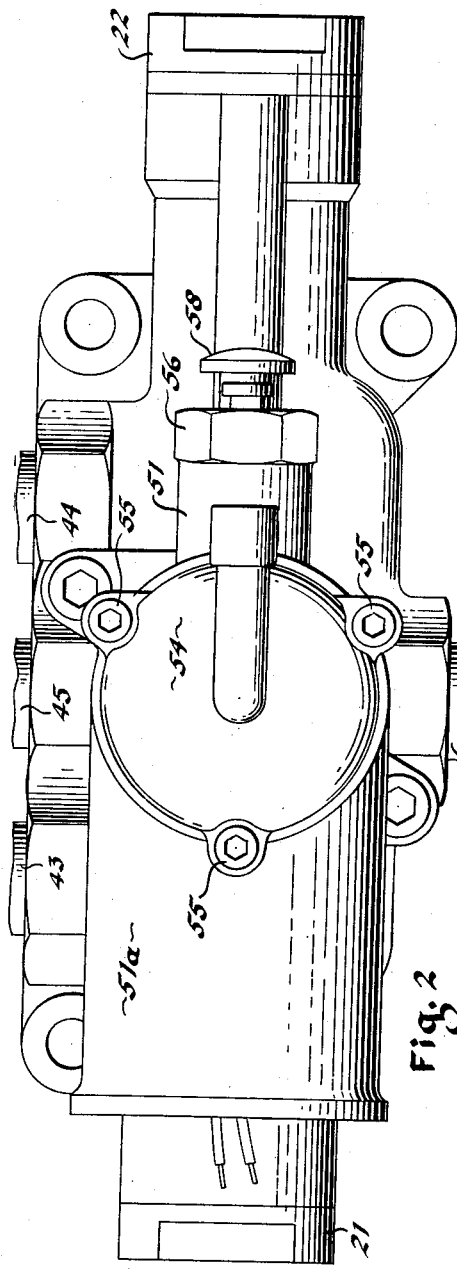
Fig. 2 is a top plan view of the valve.

Speaking first generally, Fig. 1 shows a sectional view of an assembly comprising a plunger valve A and a solenoid operated pilot control member B which have complementary meeting faces on the parting line C. Some of the structural features of the solenoid control member are shown and claimed in my co-pending application, Serial No. 314,905, filed October 15, 1952, but will be described hereinbelow to an extent necessary to understand the operation in conjunction with my plunger valve.

The main valve comprises a valve body 20, having a longitudinal cylindrical bore closed at its opposed ends by screw caps 21 and 22. The inner faces of the screw caps carry shock pads 23 and 24, the one at 23 being perforated at 23a in alignment with a passage 21a in the cap, for venting purposes.

Within the body bore there is a reciprocatable plunger 25 necked down at two locations 25a and 25b, the purpose of this reduction in diameter being to permit cross communication between certain body ports, as will appear. The plunger "floats" within suitable spacing and packing members comprising, in the present instance, a series of spacer rings 26, 27, 28, 29, and intermediate packing rings 30, 31 and 32. At the opposed outer ends of the spacer assembly there are packing rings 33 and 34, ring 33 being disposed between spacer 26 and cap 21, and ring 34 being disposed between spacer 29 and a snap ring 35 which seats in an annular recess in the bore. A washer 36 may be interposed between snap ring 35 and packing ring 34. It will be apparent that the packer-spacer assembly so far described is fixed in position, and that the plunger 25 is freely movable therewithin.

The spacers are provided with peripherally disposed apertures (shown for example at 29a, 29b on spacer 29) which permit free passage of fluid (liquid or gaseous) in cross connection between predetermined ports, as permitted by the cyclic plunger positions.

Situated at an intermediate point on valve body 20 is an inlet port 38 which receives pressure fluid from pipe 39, and can transmit it through branch passages 38a (Fig. 3), 38b (Fig. 3), and 38c (Fig. 4), to opposed ends of the body bore. On the opposite side of the body there is a centrally disposed exhaust port 40, situated between two cylinder feed ports 41 and 42 which through respective pipes 43 and 44 serve two working cylinders, or two ends of a double-acting cylinder (not shown).

Figure 3:
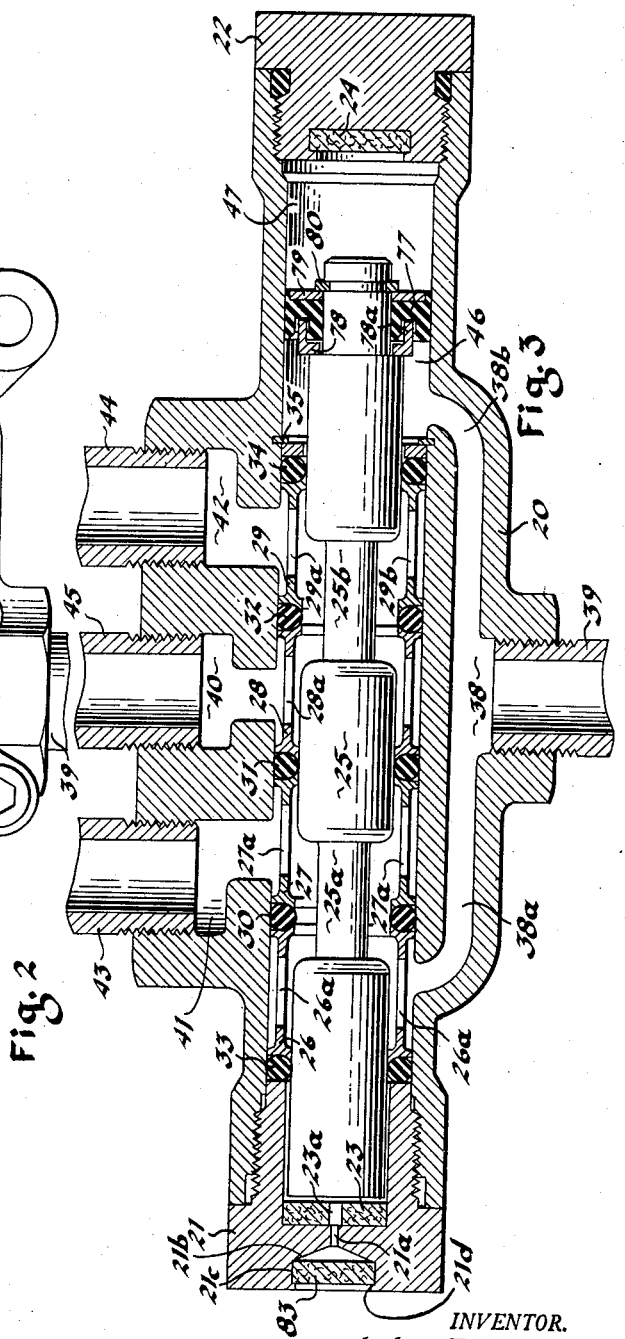
Fig. 3 is a horizontal sectional view taken on the line 3—3 of Fig. 1.

Assume that the plunger is in the position shown in Figs. 1 and 3. Pressure fluid may pass from port 38 through passage 38a, then through spacer apertures 26a and around the necked portion 25a of the plunger, and through apertures 27a into port 41 and pipe 43 to a power cylinder. At the same time the other cylinder, or the other end of the double-acting cylinder, is open to exhaust through pipe 44, port 42, apertures 29a, past the necked portion 25b, through the apertures 28a, and out exhaust pipe 45. Arm 38b feeds pressure fluid to bore portion 46, but this pressure cannot pass to the left by reason of packing member 34. It does, however, produce reversal of the plunger position by reason of the packing head at the right end of the plunger, soon to be described.

From what has already been explained, it will be apparent that when the plunger moves to the right end of the bore, pipe 43 will be opened to exhaust and pipe 44 will receive pressure fluid from pipe 39 past necked portion 25b.

The plunger will then be immediately reversed again by a preponderating pressure which will be admitted to the bore portion 47 through passage 48 by operation of the solenoid pilot valve as will appear.

The solenoid pilot valve, as to some of its features, has been disclosed and claimed in my co-pending application, Serial No. 314,905, filed October 15, 1952. It will be sufficient to say here that it comprises a body 51 in which is fixed a solenoid coil 52 which is in accessible communication with a junction box portion 51a of the body. Within the solenoid coil an armature 53 is vertically reciprocable, responsive, of course, to energization and de-energization of the solenoid by any suitable timer device. A cap 54 is retained on top by cap screws 55. A novel feature of the present assembly is a manual override valve having a body 56 and a control plunger 57 operated by button 58. The body extends into a stem 59 which carries a valve head 60. The valve is shown in seated position blocking fluid flow between passages 61 and 62. Passage 61 communicates with an annular passage 65, which in turn is in communication with inlet port 38 through passage 38c (Fig. 4). By rotating valve 57, a cut away portion of its flange 57a can pass the head 66a of a stud 66 fixed in body 56, so that the override valve can be drawn to the right (Fig. 1) opening the valve.

Assuming the valve to be open, and plunger 25 to be at the right end of its bore, fluid pressure flows from passage 65 through passage 61, past open valve head 60, through passages 62, 67, 68 and 69, past open valve head 70 (this valve being open because armature 53 is in its bottom position) through slots 53a on the armature sides, through a passage 71 in the body 51, and then through passages 64, 48, and 72 to the chamber 47 at the end of the valve body. This fluid pressure preponderates over the pressure in chamber 46, because effective on a greater available movable area, causing the plunger 25 to move to the position shown in Figs. 1 and 3.

When the armature 53 is raised by the next energization of coil 52, valve 70 at the upper end of the armature is closed, thereby terminating fluid flow as described in the last preceding paragraph. At the same time valve 74 at the lower end of the armature is opened, and the fluid in the chamber 47 can exhaust through passages 72, 48 and 71, past valve 74, and through passages 75 and 76 to exhaust port 40. Relief of pressure in chamber 47 now permits the pressure always in chamber 46 to move the plunger 25 to the right, by reason of its "head" to be described in the next succeeding paragraph, thus completing a cycle. Reciprocation of plunger 25 is thus seen to be responsive to energization and de-energization of solenoid 52.

Plunger 25 is provided with special means at its end, constituting a piston head or packing head which is the moving factor in plunger reciprocation. The plunger has an end portion 25c of reduced diameter, on which is disposed a U-shaped cup-packer ring 77 maintained in operating position by a spreader ring 78 which has an annular flange 78a extending into the packer ring slot. The packer ring is retained by a washer 79, and a snap ring 80 in a groove on part 25c.

Normally the override valve is open. If the electric current is cut off unexpectedly, or if it is desired to manually control just a few cycles of operation, for instance in setting up and checking an assembly, the override valve is opened, and pressure is admitted to chamber 47 as previously described because armature 53 remains in its lower or de-energized position. Plunger 25 moves to the left. If the override valve is then manually closed, power is cut off to chamber 47 and the plunger 25 moves to the right. Pressure in fluid chamber 47 may exhaust to atmosphere past a reduced diameter portion of the override valve body in the nature of a loose fit between the plunger 57 and the body 56. Fluid flow between the valve body 56 and the plunger 57 is prevented when the plunger 57 is withdrawn by the seating of the valve head 60 in a suitable cavity formed in the inner end of the valve body 56. This cyclic procedure may be repeated as often as desired.

In operation the plunger strikes the shock pads 23 and 24 alternately, which, of course, reduces the shock and noise of valve operation. The rate of cyclic reversal is, of course, governed by the number of current interruptions to coil 52 per unit of time.

The passage 21a flares outwardly at 21b to provide an annular nest 21c for a filter 83 which prevents dust or other foreign matter from entering the plunger bore. While this may be made from any suitable filter material, I prefer one formed from sintered metal powder such as bronze powder which I have found extremely satisfactory from the standpoint of service life and efficient performance. An annular bead 21d retains the filter in position. The sintered metal type of filter is of course perforate, to permit passage of air therethrough.

What I claim is:

1. Valve mechanism of the character described comprising a body having a cylindrical bore of uniform diameter therein, a cap at each end of the bore, a plunger reciprocable in said bore, a plurality of ports through said body affording fluid-flow entrances to said bore, a series of packing members in peripheral contact with the inner wall of said bore at longitudinally spaced locations between adjacent ports and outwardly in the bore beyond the ports, said plunger having sliding, leak proof contact with said packing members and being reduced in diameter at spaced locations whereby to permit fluid flow between predetermined pairs of ports by suitable movement of said plunger, packing retaining means of annular form located in said bore whereby to maintain said packing members between it and a first end of the bore, the bore wall having an annular groove therein and said packing retaining means consisting of a split spring ring seated in said groove and having a portion projecting from said groove into said bore, a pressure chamber between said packing retaining means and a second end of said bore, one end of said plunger being movable within said pressure chamber, said end of said plunger being provided with a pressure-retaining head movable in pressure sealing contact with the bore wall, means for maintaining pressure fluid in said pressure chamber on the side of said pressure head towards said series of packing members whereby to bias said plunger to movement towards said second end of said bore, means for introducing pressure fluid intermittently on the side of said pressure head away from said packing members whereby to intermittently drive said plunger towards the first end of said bore, said last-named means consisting of a fluid flow control valve, solenoid energized means for opening and closing said last-named valve, and manually operatable normally open valve means in series with said fluid flow control valve for admitting and discharging pressure fluid on the side of said pressure head away from said packing members independent of the energization of said solenoid energized means.

2. A valve including a housing having an enclosed bore therein, said housing having a plurality of ports in communication with said bore, a plunger of less length than said bore operatively disposed in the bore for reciprocation, means on said plunger to permit pressurized fluid to flow between certain of said ports when the plunger is reciprocated to predetermined positions in the bore, fluid control means for controlling the flow of fluid to and from said plunger to reciprocate the same, solenoid means to actuate said control means, and a manually operated override valve for directly supplying and exhausting fluid to and from said plunger to reciprocate the same independently of the energization of said solenoid means.

3. A valve including a housing having an elongated bore therein closed at its ends, said bore having an enlarged chamber at one end thereof having a longitudinal wall, said housing having a plurality of ports extending between the bore and the exterior of the housing, a plunger of lesser length than said bore disposed in the bore for reciprocation, means on said plunger to permit pressurized fluid to flow between predetermined ports when said plunger is reciprocated to predetermined positions in said bore, said plunger having a fluid pressure retaining head at one end thereof disposed in said chamber in fluid-tight contact with said longitudinal wall, said head having an area for exposure to fluid pressure on its end nearest the adjacent end of the bore greater than the area at its other end which is exposed to fluid pressure, means for maintaining pressurized fluid on said other end of said head to bias said plunger towards said adjacent end of the bore, a solenoid operated control valve for controlling the flow of pressurized fluid to and from said first-named end of said head to reciprocate said plunger, and a manually operated valve disposed in said second-named valve for controlling the flow of pressurized fluid directly to and from said first-named end of said head to reciprocate said plunger independently of the operation of said second-named valve.

4. A valve including a housing having a bore therein and closed at its ends, one end of the bore terminating in an enlarged chamber having a longitudinal wall, said housing having a plurality of ports extending between said bore and the exterior of said housing, a plunger of lesser length than said bore disposed in the bore for reciprocation, means on said plunger to permit pressurized fluid to flow between predetermined ports when said plunger is reciprocated to predetermined positions in said bore, said plunger having a fluid pressure retaining head at one end thereof disposed in said chamber in fluid-tight contact with said longitudinal wall, said head having an area for exposure to fluid pressure on its end nearest the adjacent end of the bore greater than the area at its other end which is exposed to fluid pressure, means for maintaining pressurized fluid on said other end of said head to bias said plunger towards said adjacent end of the bore, a control valve disposed on said housing, said housing and said control valve including a passageway through which pressurized fluid may flow from a source to said first-named end of said head, said control valve having a solenoid operated means for controlling the flow of pressurized fluid in both directions through said passageway, and a manually operated override valve for controlling the flow of pressurized fluid in both directions through said passageway when said solenoid operated means is de-energized, said override valve comprising, a housing having a bore therein, and a stem disposed in said second-named bore for longitudinal movement therein and extending outwardly from said last-named housing, said stem having a head at one end to seal said passageway from said source when said stem is in one position in said second-named bore and to permit such fluid flow when said stem is in a second position in the bore, said stem having a loose fitting engagement with the walls of said second-named bore to form a restricted passageway therebetween and extending to the exterior of said last named housing whereby fluid in a portion of said first-named passageway may escape to the exterior of the housings when the stem is disposed in said first position, said head being adapted to seal said restricted passageway when said stem is disposed in said second position.

5. A valve including a housing having an enclosed bore therein, said housing having a plurality of ports in communication with the bore, a plunger of lesser length than the bore and reciprocably disposed therein, a series of packing members longitudinally disposed in the bore between the longitudinal wall thereof and the plunger, said members having peripheral sealing contact with the longitudinal wall of the bore, said plunger having sliding leak-proof contact with the packing members and having a necked-down portion to permit fluid flow between certain of said ports when the plunger is reciprocated to predetermined positions in the bore, packing retaining means disposed in the bore to maintain the packing members in position between it and a first end of the bore, said bore including a chamber between the packing retaining means and a second end of the bore, one end of said plunger having a head reciprocably disposed in said chamber in sealing contact with the longitudinal wall thereof, means for maintaining fluid pressure in the chamber on the side of said head toward the series of packing members, and means for supplying and discharging fluid pressure to and from the chamber on the side of the head away from the series of packing members to reciprocate the plunger.

6. A valve including a housing having a bore therein, said housing having a plurality of ports affording fluid flow entrances to said bore, a plunger positioned for reciprocation in said bore, means on said plunger to direct fluid flow between certain of the said ports when the plunger is reciprocated to predetermined positions in said bore, means responsive to differential fluid pressure force for reciprocating said plunger, a solenoid-operated pilot valve for regulating fluid flow to the latter said means to effect plunger reciprocation, and a manually operable override valve for directly supplying and exhausting fluid to the latter said plunger reciprocation means independently of the energization of said solenoid-operated pilot valve to effect plunger reciprocation.

7. A valve according to claim 6 wherein said override valve comprises a stem with a head portion thereon disposed in a passageway for communicating a fluid-pressure source with said plunger-reciprocation means, and means for supporting said stem for movement of said head portion in said passageway, a first seat in said passageway engageable by said head portion to close said passageway, an exhaust opening through said stem-supporting means communicating with said plunger-reciprocation means when said passageway is closed by said head portion for exhausting fluid pressure from said plunger-reciprocation means, and a second seat in said passageway to which said head portion is movable by said stem to open said passageway for communication of pressure to said plunger-reciprocation means and for closing said exhaust opening.

8. A valve according to claim 7 wherein said override valve further comprises means for locking said stem against movement while said head portion is engaged with said first seat.

References Cited in the file of this patent
UNITED STATES PATENTS

| | | |
|---|---|---|
| 579,780 | Tower | Mar. 30, 1897 |
| 1,230,150 | Geraghty | June 19, 1917 |
| 2,387,008 | Buchanan | Oct. 16, 1945 |
| 2,517,061 | Von Stackelberg | Aug. 1, 1950 |
| 2,605,079 | Miller | July 29, 1952 |
| 2,616,449 | Maha | Nov. 4, 1952 |
| 2,621,885 | Schmitt | Dec. 16, 1952 |
| 2,624,585 | Churchill | Jan. 6, 1953 |
| 2,645,450 | Chessman | July 14, 1953 |
| 2,661,182 | Kipp | Dec. 1, 1953 |
| 2,741,478 | Mercier | Apr. 10, 1956 |
| 2,823,647 | Meyer | Feb. 18, 1958 |
| 2,826,178 | Kropf | Mar. 11, 1958 |